Patented Dec. 29, 1931

1,838,968

UNITED STATES PATENT OFFICE

CHARLES A. STYER, OF WILKINSBURG, PENNSYLVANIA, ASSIGNOR TO WESTINGHOUSE ELECTRIC & MANUFACTURING COMPANY, A CORPORATION OF PENNSYLVANIA

DEOXIDIZING MATERIAL AND METHOD OF FORMING THE SAME

No Drawing.   Application filed April 5, 1928.   Serial No. 267,788.

My invention is concerned with the preparation of deoxidizing material for use in connection with providing an inert atmosphere.

My invention resides in the method of preparing deoxidizing material, such as charcoal, whereby the latter will efficiently remove oxygen from a substantially inert atmosphere when said material is raised to a predetermined temperature by a heater.

In my copending application, U. S. Serial No. 267,789, filed April 5, 1928, I show and describe a structure for obtaining an atmosphere wherein the deoxidizing material used is in block form which is an improvement in the method outlined in my prior application, U. S. Serial No. 683,379, filed December 29, 1923, wherein the material used is in granular form. As pointed out in the former application, the structure utilizing a block of deoxidizing material facilitates the removal of ash and thereby permits the use of deoxidizing material having the desirable composition herein set forth.

The deoxidizing carbon is used in the form of molded blocks prepared by a forming process followed by a heating or firing treatment. The essential object aimed at in the preparation of materials and block-forming procedure are the production of a block of carbon which is:

(1) Readily oxidizable at moderately elevated temperatures;

(2) Free from adherent or combined hydrocarbons;

(3) Low in ash-forming constituents, and (4) Having a degree of hardness and mechanical strength sufficient to withstand the usage to which it may be normally subjected.

It is further characteristic of my invention that charcoal or similar material prepared in accordance therewith contains a negligible quantity of undesirable ash-forming constituents.

It is further characteristic of a material prepared in accordance with my invention that tarry or hydrocarbon matter, of which the essentially undesirable element is hydrogen, is removed.

It is further characteristic of my invention that, in addition to the removal of undesirable substances from the deoxidizing material, such as charcoal, desirable substances are combined therewith in accordance with my method of preparation.

It is also characteristic of material prepared in accordance with my invention that it may be caused to burn at a useful rate at a substantially low temperature.

It is also characteristic of material prepared in accordance with my invention that it burns without the formation of undesirable water vapor.

It is further characteristic of my material that, when prepared in a block for cooperation with a heater, it burns with a residue of ash insufficient to interfere with the continued operation of the deoxidizing device.

My invention resides in the deoxidizing material and in the method of preparation thereof, as hereinafter described and claimed.

As indicated above, the present application is closely allied with my copending application, Serial No. 267,789, filed April 5, 1928, and covers the material to be used in apparatus of the character set forth therein.

Material prepared in accordance with my invention is particularly applicable for use in apparatus for maintaining an inert atmosphere above the level of an insulating fluid for an electrical device, such as a transformer. In transformers or similar electric machines in which the electrical parts are immersed in an insulating oil, explosions have resulted from the ignition of mixtures of hydrocarbon gases and air in the space above the oil level.

In my application mentioned above, I have shown how the inert atmosphere confined above the level of an insulating fluid in a transformer tank may be maintained inert by passing the gases through an apparatus in which suitably prepared carbon is subjected to the heat of a grid that is raised to a suitable temperature. Any oxygen that is present in the inert gas reacts with the heated carbon to form carbon dioxide and, in some cases, carbon-monoxide. Both of these gases are inert, and the undesirable oxygen is thereby removed from the inert gas. It may be well to mention here that it is also desirable to maintain the inert gas above the oil level as dry as possible because of the deleterious effects of water vapor in electrical apparatus of the character described.

I prefer that the major portion of the raw material to be used for the carbon block prepared in accordance with my invention shall be some form of commercial charcoal. Blocks of deoxidizing carbon have been prepared from cellulosic raw materials, such as maple wood, but since the manufacture of the usual forms of commercial charcoal is well known, I will not describe it here. The commercial chars, such as cocoanut-shell char, fruit-pit char or harwood char, are ordinarily supplied in lump or coarsely granular form, and usually contain ash-forming constituents in quantities objectionably large for the purpose here described, and invariably contain hydrogen in chemical combination with carbon.

I have found, by experiment, that the most satisfactory combination of mechanical properties and oxidizing properties results from the use of a wide range of particle size of the granular carbon. The raw material is crushed to pass a screen of approximately 28 meshes to the linear inch, but the crushing and sieving are so conducted as to avoid the production of an excessive proportion of very fine particles.

The crushed material usually contains certain ash-forming substances, such as compounds of calcium and magnesium, which it is desirable to remove. I have found that, by treating the charcoal with chlorine, a material may be prepared which is free from hydrogen and undesirable ash-forming constituents. As indicated above, the undesirable substances include tarry or hydrocarbon matter of which the essentially undesirable element is hydrogen and certain ash-forming substances. As also indicated above, hydrogen is objectionable as a constituent of deoxidizing material when such material is used for the production of inert atmosphere in an electrical apparatus because such hydrogen oxidizes to form water.

It is well known that the carbonized product resulting from the destructive distillation of hydrocarbons or carbohydrates contains varying amounts of chemically combined hydrogen and that the complete removal of such hydrogen cannot be effected by the application of heat alone.

The hydrogen may be more or less completely removed by treating the carbonaceous material with gaseous chlorine at a sufficiently elevated temperature to bring about the following reaction:

$$\frac{y}{2}Cl_2 + C_xH_y = xC + yHCl$$

In which $C_xH_y$ represents the general formula for any one of the mixtures of hydrocarbons of undetermined composition which are present in ordinary charcoal.

The above chemical equation indicates that the hydrogen is removed in combination as gaseous HCl.

Among the objectionable ash-forming constituents of charcoal is silica $SiO_2$. At a suitable temperature and in the presence of carbon, the chlorine attacks the $SiO_2$ with the formation of gaseous $SiCl_4$. In this case, the following reaction takes place:

$$2Cl_2 + SiO_2 + C = CO_2 + SiCl_4$$

It may be well to mention here that certain metallic elements or compounds, for example, iron, which may be present in the charcoal and the chlorides of which are volatile at the temperature employed to bring about the above reaction, will be removed. Such removal is desirable if the amount of such metals in the charcoal is objectionably high.

By treating the carbonaceous material with chlorine at a suitable temperature to effect either or both of the above two reactions, I obtain an improved deoxidizing material having a very low ash content.

After the crushed material has been removed from the crushers, certain ash-forming substances not removable by chlorine may be removed by treating the material to aqueous hydrochloric acid.

As hereinbefore indicated, the deoxidizing material may be further improved by the addition of certain desirable substances. Such materials are desirable which have the effect of lowering the temperature to start oxidation of the carbon (at least to start it oxidizing at a measurable rate) and of increasing the rate of oxidation at a given temperature. I have found, by experiment, that these effects may be accomplished by the addition of certain metallic salts, such as the following: cobalt chloride, manganese chloride, nickel chloride, sodium chloride, sodium sulphate and sodium hydroxide. It may be mentioned here that these substances are the forms of a combination in which the materials may be introduced into the carbonaceous matter and it is not unlikely that some of them undergo a chemical change in the treatment given the charcoal preparatory to burning it.

In illustration of the above, the following experimental results are presented:

First, a molded block of wood charcoal, to which a small percentage of cobalt-ammonium chloride had been added, ignited and became incandescent over its entire surface when exposed for a short time to the radiant heat from an incandescent heating source. On removing the block of charcoal from the heating source, the oxidation of the block continued until the combustible matter was entirely consumed. A similar block of the same charcoal, without the cobalt salt, did not ignite when exposed in the same manner, even after a much greater period of time.

Second, a piece of briquetted charcoal material held in a flame ignited only slowly and, on removal from the flame, did not continue to burn even with the aid of a draft of air. A few drops of potassium iodide solution were placed on the same material and the water evaporated off. On holding the material in the flame, the block of charcoal ignited readily and continued to burn without the aid of external heat.

Third, two small blocks of unimpregnated material were placed side by side in the furnace with two blocks of the same material which were impregnated, one with approximately 1% by weight of sodium sulphate ($Na_2SO_4$) and the other with approximately 1% of manganese chloride ($MnCl_2$). While freely exposed to the air, the temperature was raised to 430° C. and held there within plus or minus 3 degrees. Before quite reaching 430° C., the $Na_2SO_4$ block showed distinct evidence of oxidation. The $MnCl_2$ block gave indication of oxidation in two hours after the temperature of 428° C. was first reached. In approximately five and one-half hours after 428° C. was first attained, both of the impregnated blocks were completely burned while the unimpregnated blocks were practically unchanged, only one of them showing a very slight indication of oxidation after two hours, with no discernible increase throughout the remainder of the test.

It may readily be seen that the above three experiments determine quite definitely that the impregnating substances mentioned above cause the oxidation of the charcoal block to proceed at a desirably useful rate at moderately elevated tempertures.

Either before or after the extraction treatment for removing the ash-forming substances in the pre-treatment of the crushed charcoal, the material is treated to remove the combined hydrogen therein. Such treatment may be effected by elevating the temperature of the material in the presence of steam, carbon dioxide, chlorine, or a stream of inert gas, such as nitrogen.

The partially carbonized sugar which forms one of the component parts of the mixture used in preparing the molded blocks comprising my invention is prepared by subjecting pure white sugar (sucrose) to heat for the purpose of removing most of its volatilizable decomposition products before incorporating it into the mixture from which the blocks are to be formed. The carbonization is carried to that stage of decomposition in which the evolution of steam and gaseous decomposition products is relatively slight and the resulting product, when hot, has passed from a syrupy to a gummy and slightly elastic consistency. This product is then cooled and, being then hard, is crushed to pass through a sieve having approximately 28 openings per linear inch.

*Composition and proportions.*—While the proportions herein given may be varied somewhat without impairing the desired properties, the following table gives a desirable mixture which I have found to be satisfactory, together with the quantities required for yielding a finished block of deoxidizing material that is approximately three inches by three inches by ten inches in size:

| | Parts by weight | Grams for 90 cu. in. block |
|---|---|---|
| Pre-treated granular char | 100 | 1,200 |
| Partly carbonized sugar | 10 | 120 |
| Potassium iodide | 1 | 12 |
| Water | 65 | 780 |

The dry materials of the above table are first thoroughly mixed in the dry state. Water is then slowly added, and mixing is continued until the batch is of uniformly moist consistency. It is then transferred to a mold and compressed with a maximum pressure of approximately ⅔ of a ton per square inch. The resulting block is removed from the mold, broken up in a mixing machine and remolded to a pressure of approximately ⅔ of a ton per square inch. The breaking up and remolding process mentioned above is for the purpose of producing a more uniform product, due to the more thorough interpenetration of the constituents of the mixture, which is not possible by a single molding treatment.

After the final molding, the block is dried in air at a temperature of between 110° C. and 120° C. for approximately 20 hours to remove the water. It is then placed in a retort designed to uniformly heat the block and heated in a stream of nitrogen as follows: First, the block is raised to approximately 205° C. and held at such temperature for approximately 30 minutes to allow the partly carbonized sugar to soften and cement together the carbon granules; second, the temperature is raised to 800° C. and held at such temperature for approximately 30 minutes to complete the carbonization of the partly carbonized sugar and the separation of the residual combined hydrogen.

The deoxidizing block is now in its final form and may be immediately inserted in the machine for which it is designed after its surface has been prepared for the heating grid. The surface of the block which has been once subjected to oxidizing conditions starts oxidizing more readily when exposed to oxygen than if it were not preoxidized. To produce such a desirable condition of the surface, the hot block, the firing of which at 800° C. for 30 minutes has been completed, may be subjected to one of the following treatments:

(1) Admit $CO_2$ to the retort while the latter is above 700° C. in order to effect the reaction $$CO_2 + C = 2CO$$

and then continue the cooling either in a stream of $CO_2$, nitrogen or a mixture of them;

(2) Admit steam while the temperature is above 700° C. to effect the reaction $$H_2O + C = CO + H_2$$

and continue the cooling either in steam, nitrogen, or a mixture of them;

(3) Allow to cool in nitrogen to a temperature of 500° C. and admit air to the retort to effect the reaction $$O_2 + C = CO_2$$

This last is an exothermic reaction, and the supply of air must be limited to such quantity as will sweep out the nitrogen and effect the desired amount of oxidation of the block. Oxidation may be stopped and cooling continued by shutting off the supply of all gas to the retort or by substituting nitrogen or $CO_2$ for the air.

The resulting product is a block of carbonaceous deoxidizing material which may be immediately inserted in the structure described in my copending application previously referred to. This block of carbonaceous material, when placed over a heated grid, deoxidizes any atmosphere that is passed near the heated surface. The resulting inert gas is dry and free from oxygen. The deoxidation of the gases passed near the heated surface slowly consumes the carbon block with the formation of ash in quantity insufficient to interfere with the continued operation of the device, which, as set forth in my copending application, is most desirable. It has been found in practice that a deoxidizer prepared in the manner described contains less than 2½% of ash.

Various changes and modifications may be made in my method of preparing a block of deoxidizing material without departing from the scope of my invention. For example, the partially carbonized sugar acts as a binding agent for the granular charcoal. Other equivalent carbonized material which may be oxidized without leaving a substantial amount of ash may be utilized as a binding agent instead of the carbonized sugar, such as dextrose, glucose or starch.

Other modifications of my invention will be apparent to those skilled in the art. I desire, therefore, that only such limitations shall be imposed thereon as are required by the prior art and the appended claims.

I claim as my invention:

1. A deoxidizer comprising a carbonaceous material cemented together into solid form and containing a small percentage of an ingredient which is capable of increasing the oxidation of the carbonaceous material in the presence of oxygen or a substance containing oxygen.

2. A deoxidizer comprising granular char cemented together into solid form by a carbonaceous binding material and containing a small percentage of an ingredient that is capable of increasing the rate of oxidation of the material.

3. A deoxidizer comprising granulated char cemented together by a carbonaceous binding agent and containing a small percentage of a metallic salt that is capable of increasing the combustion of the deoxidizer in the presence of oxygen or a substance containing oxygen.

4. A deoxidizer comprising a carbonaceous material comparatively free from hydrogen and ash forming constituents cemented together in solid form by a carbonaceous binding agent from which the major portion of volatile decomposition products have been removed.

5. A deoxidizer comprising carbonaceous material comparatively free from hydrogen and ash forming constituents cemented together in solid form by a partially carbonized binder from which the major portion of the volatile matter has been removed, said deoxidizer being impregnated with an ingredient capable of accelerating the rate of oxidation of the carbonaceous material in the presence of oxygen or a substance containing oxygen.

6. A deoxidizer in solid form having a preoxidized outer surface comprising granular carbonaceous material bound together into block form by a carbonaceous binding agent.

7. A deoxidizer in solid block form having a preoxidized outer surface comprising granular carbonaceous material impregnated with an ingredient capable of increasing the rate of oxidation of the material, the carbonaceous material being cemented together into solid form by a carbonaceous binding agent.

8. In the method of preparing a solid deoxidizer, the steps which comprise removing hydrogen and ash forming constituents from granular carbonaceous material and binding together the granular particles by a partially carbonized material from which the volatile decomposition products have been removed.

9. In the method of preparing a solid deoxidizer, the steps which comprise removing hydrogen and ash forming constituents from granular carbonaceous material, impregnating the material with an ingredient that is capable of accelerating the rate of oxidation of the material, and binding the particles together into solid form.

10. In the method of preparing a solid deoxidizer, the steps which comprise removing hydrogen and ash forming constituents from granular carbonaceous material, impregnating the granular particles with a small percentage of a metallic salt capable of accelerating the rate of oxidation of said material in the pressure of oxygen or a substance containing oxygen, and binding the material together for a partially carbonized binding agent.

11. The process of forming a deoxidizer which comprises mixing together granulated char, a metallic salt which is capable of increasing the oxidation of the carbonaceous material in the presence of oxygen or a substance containing oxygen, a binding agent and a sufficient amount of water to form a mixture having a moist uniform consistency, molding the material together into block form, and removing the water.

12. The process of forming a deoxidizer which comprises mixing together granulated char, a metallic salt which is capable of increasing the oxidation of the carbonaceous material in the presence of oxygen or a substance containing oxygen, a partially carbonized binding agent and sufficient water to form a mixture having a uniform moist consistency, compressing said mixture in a mold to form a block, removing the water from the block, raising the temperature of the block to cause the binding agent to cement together the carbon granules, and finally raising the temperature of the block to complete the carbonization of the binding agent.

13. In the process of preparing a deoxidizer, the steps which comprise molding granular carbonaceous material and a carbonized binder into block form and oxidizing the outer surface of the block.

14. The process of forming a deoxidizer which comprises mixing together granulated char, a metallic salt which is capable of increasing the oxidation of carbonaceous material in the presence of oxygen or a substance containing oxygen, a partially carbonized binding agent and sufficient water to form a mixture having a uniform moist consistency, compressing said mixture to form a block, removing the water, raising the temperature of the block to cause the binding agent to cement together the carbon granules, raising the temperature of the block to complete the carbonization of the binding agent and finally oxidizing the outer surface of the block.

In testimony whereof, I have hereunto subscribed my name this 27th day of March, 1928.

CHARLES A. STYER.